Patented Dec. 9, 1947

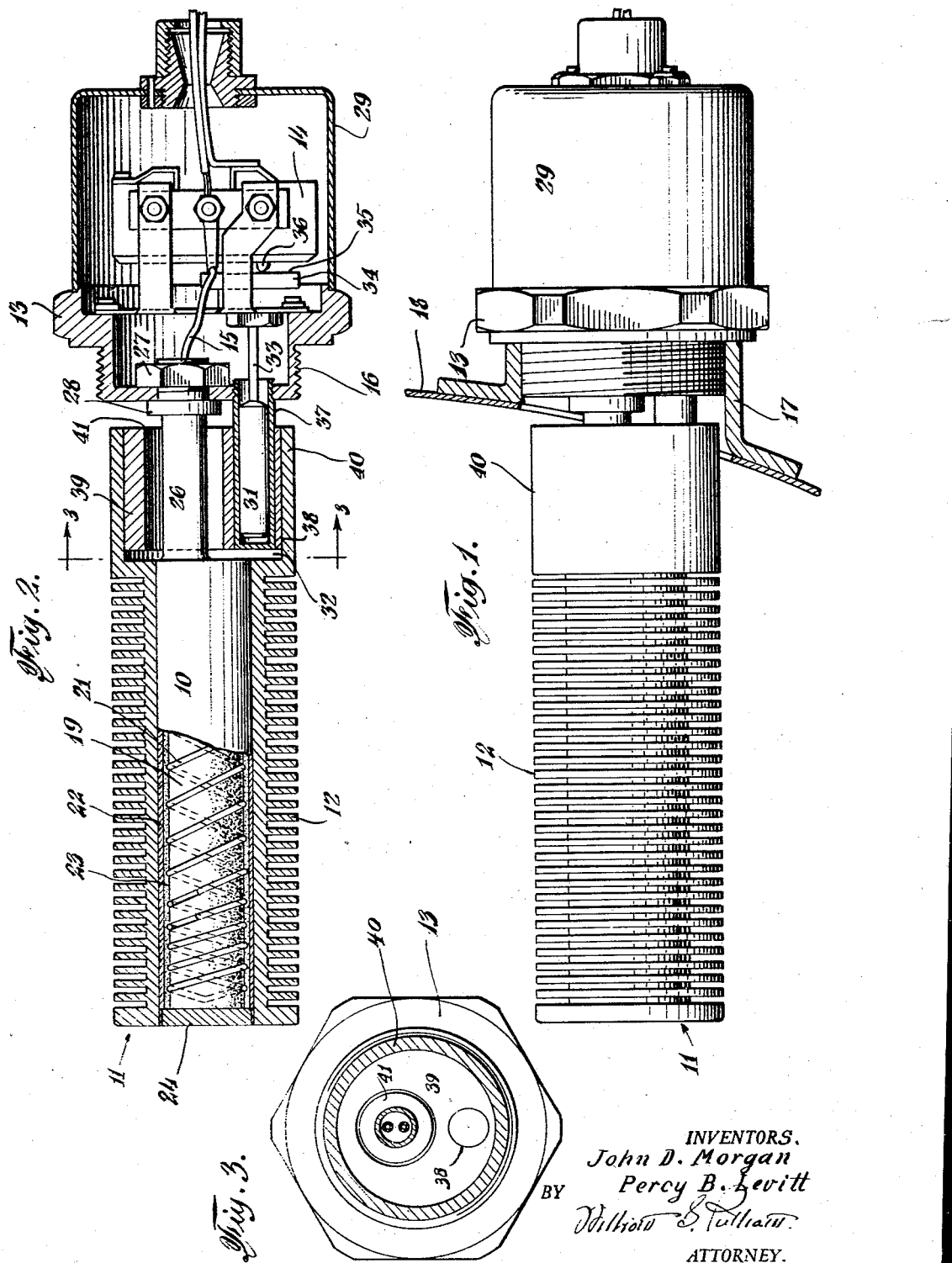

2,432,169

UNITED STATES PATENT OFFICE 2,432,169

ELECTRIC IMMERSION HEATER

John D. Morgan, South Orange, and Percy B. Levitt, Millburn, N. J., assignors to Cities Service Oil Company, New York, N. Y., a corporation of Pennsylvania Application December 29, 1944, Serial No. 570,260

3 Claims. (Cl. 219—38)

This invention relates to electric immersion heaters, and more particularly to heater units which are especially suited for the direct warming of lubricating oil in internal combustion engines and the like.

The warming of a body of lubricating oil of the kind normally used in aircraft engines and similar equipment by the direct application of localized heat is made particularly difficult by the poor heat conductivity of the oil itself. Where electric immersion heaters are employed in engine lubricating systems, for example, it is essential to make provision for adequate circulation, so that all of the oil may be heated by direct contact with the surfaces of the immersion unit. If this is not done, the entire output of the unit will be dissipated by conduction through the body of oil, with a consequent overheating and cracking of the liquid in the immediate vicinity of the heating surfaces, and with an inadequate warming of the portions of the oil which are remote from the unit. The problems of maintaining adequate oil circulation and uniform heat distribution become particularly acute in the warming of a body of make up oil which is carried in an auxiliary tank, forming no part of an engine lubricating system, and which serves only as a source from which oil may be constantly withdrawn to replace that lost from the engine system by burning and other normal causes. It will also be appreciated that all of the problems of oil warming are magnified by extremely low operating temperatures such as those encountered in aircraft work, and yet it is engines which are subjected to these extreme temperature conditions which most need adequate oil heating.

The principal object of the invention is to provide an electric immersion heater which may be installed directly in the lubricating system of the engine, or in an auxiliary tank containing make up oil for such a system, and which is so arranged that it will initiate and maintain a thermal circulation of oil over its heating surfaces at such a rate that the entire body of oil in the system or tank will be heated more or less uniformly and without localized overheating of any part of it to a temperature at which cracking and carbonization may occur.

It is another object of the invention to provide a heating unit having a plurality of vertically disposed fins on its outer surfaces which serve to divide the body of oil in which the unit is immersed into a series of vertical streams, each of which is of such depth and thickness that it may be rapidly heated to a desired final temperature, and is so guided that the heated oil will rise through the body of oil to initiate a very active thermal circulation throughout the body. The result of this arrangement is a rapid heating of all of the oil in the system by contact with the heating surfaces, rather than by heat conduction through the oil itself, thus effectively reducing any likelihood of localized overheating and cracking.

It is yet another object of the invention to provide a heater in accordance with the foregoing having thermostatic means for limiting the maximum temperature which the heating surfaces can attain at some value below that at which the cracking and carbonization of oil can occur, and which serves therefore to prevent the destruction of the oil or the damaging of the heater in the event that circulation is not initiated promptly in a body of thoroughly chilled and stiff oil, or in case an established circulation is interrupted in any way.

It is a further object of the invention to provide a heater unit having its heating surfaces thermally isolated from a coupling member or the like which serves to support the unit in a chamber containing a body of oil, in such a manner as to minimize loss of heat by conduction to the coupling member and the walls of the chamber in which it is mounted, and effectively to confine all of the heat generated by the unit to dissipation in the oil in which it is submerged.

The foregoing and other objects of the invention, along with the various features thereof, will be more fully brought out in the following description of an embodiment of it as illustrated in the accompanying drawings, in which:

Fig. 1 is an elevational view of the electric immersion heating unit mounted in the horizontal position in which it is intended to be used in the wall of an oil tank or the like;

Fig. 2 is a sectional view of the heater of Fig. 1 illustrating its various structural features and arrangements, and Fig. 3 is a sectional view taken on the line 3—3 of Fig. 2.

The heater unit which is shown in the drawings comprises an electric resistance element 10 mounted in a casing 11, having its outer surfaces greatly extended by heat radiating fins 12, and supported by a coupling member 13 which also serves as a housing for a thermostatic switch 14 in circuit with the resistance element through lead wires 15. This particular unit is designed to be mounted in the lubrication system of an aircraft engine, or in an auxiliary tank, with its casing 11 disposed in a horizontal position so that the fins 12 may define a series of vertically extending channels through which a thermal circulation of oil may be established when the heater is in operation. The coupling member 13 is accordingly provided with external threading 16 which is adapted to cooperate with the integrally threaded boss 17 to support the unit in the side wall 18 of an oil container as is shown in Fig. 1. In order better to bring out the several features of this heater unit it will be assumed that the side wall 18 (of which only a fragment is shown in Fig. 1) represents a part of an auxiliary oil tank of a heavy bomber or similar plane from which make up oil may be withdrawn in flight, to maintain the lubricating system of the plane engine properly filled at all times.

The heating element 10 as here shown, includes a core 19 of zircon refractory material which serves to support a number of turns of any appropriate resistance wire 21 in such spaced relation as to produce a substantially uniform temperature rise throughout the length of the core, all mounted within, and appropriately insulated from, a metal shell 22. In making this unit, the core and wire are coated with a wash of milled grain zircon and natural grain zircon in about equal parts, bonded together with a mixture of 6% $P_2O_5$ and 2% chromic acid, after which the coating is hardened by heating the assembly to a temperature of about 600°. The core assembly is then centered in shell 22 and packed therein with a layer of fine zircon sand 23, after which it is sealed in place by the insertion of a plug 24, or the application of any other appropriate closure to the open end of the shell. The heating element described above and shown in the drawings, is constructed in accordance with the invention set forth in copending application S. N. 495,171, filed July 17, 1943, now Patent No. 2,371,696, but any other satisfactory form of heating element may be substituted therefor without departing from the present invention.

The casing element 11 is preferably made of a metal of high thermal conductivity which is adapted to transfer heat rapidly from shell 22 of the heating element to a body of oil in which the entire unit is immersed. This element of the illustrated unit is made of Duralumin, which meets all heat transfer requirements, and by reason of its very light weight, particularly suits it to use in a heater designed for aircraft work. In the illustrated device, the fins 12 are preferably formed as integral parts of the casing, in order to insure perfect heat transfer to them, and to avoid the problems which are incident to the application of separately formed fins. It is to be understood, however, that the invention is not limited to the use of a Duralumin casing, and that separately applied fins can be employed in place of the integral ones here shown, whenever that is expedient or is otherwise desirable.

It is particularly to be noted that fins 12 cover only that section of the casing which overlies the shell 22 of the heating element, and that the bore of this part of the casing is just large enough to receive shell 22. In general, it has been found that frictional engagement between the shell and casing is entirely adequate to hold these two parts together. Positive interlocking of the shell and casing is not usually required, although means may be provided for this purpose if desired.

The utilization of a unitary heat transfer casing 11, and a separately formed heating element having its own shell 22, has some advantages in simplifying manufacturing procedures, and also in making easier the replacement of a burnedout heating element or of a damaged heat transfer casing. Those familiar with the art will readily appreciate, however, that the invention is not limited to the use of a built-up structure as herein shown, but that its full advantages may be attained in a unit in which the casing 11 and shell 22 are embodied in a single part.

The heating element 10, and transfer casing 11 in which it is mounted, are secured to coupling member 12 by a stud element 26 which is of relatively small diameter. In the illustrated device this stud is secured to the right hand end of shell 22 (Fig. 2), and has its outer end threaded to receive a nut 27 which effectively clamps the bottom of the coupling member between itself and shoulder 28. The stud element is preferably of tubular character so that it may also serve to confine the electrical leads 15, which connect resistance wire 21 of the heating element, to switch 14 mounted on the coupling member, and protected by a cover element 29.

It has been found that the fins 12 of the heater unit greatly facilitate the initiation and maintenance of thermal circulation throughout the entire body of oil confined in the tank represented by wall 18. Thus, the fins serve to divide the oil into a series of thin and deep streams, each of which can be quickly and thoroughly heated to a more or less uniform temperature. In practice, it has been found that the streams of oil hug the heating surfaces from the lower part of the casing to its top, and have no tendency towards recirculation along the sides of the unit. The small volume of oil which is heated in this way accordingly rises rapidly from the unit, and quickly initiates an active circulation of the entire volume of oil confined in the tank. The overall result is that all of the oil is caused to flow over the heater unit so that it may be warmed by direct contact with the finned surfaces, to a more or less uniform temperature and without stagnation in the vicinity of the unit and a consequent likelihood of localized overheating. The extent of the thermal flow which is generated over the finned surfaces has been found to be much greater than can be obtained with a plain surfaced heater of substantially the same total area, and having an equal wattage rate.

The actual dimensions of fins 12 and of the channels which they form may be varied within reasonable limits depending upon the type of service to which the heater unit is put, and upon other factors. The illustrated device has fins of about one-sixteenth inch thickness set on one-eighth inch centers, and each of them has a depth of about nine-thirty-seconds of an inch. Satisfactory results have been obtained, however, with fins of the same size set on one-quarter inch centers. Even wider spacing has been employed without serious loss of effectiveness, and in such cases the overall diameter of the fins may be increased to some advantage. Best results have been obtained with a finned surface having a channel depth-to-width ratio of 3:1. The quite closely spaced fins of the illustrated device have given excellent results in aircraft oil heating service where wide extremes of temperature are encountered, and where the unit is frequently called upon to warm a body of oil which has been chilled to an almost greaselike consistency.

In considering the operation of the heater unit it will be assumed that the oil in tank 18 is to be maintained at a temperature of about 140° F. When, in the course of the heating operation, the oil adjacent the unit approaches this or some other predetermined temperature, the electric heating circuit is preferably opened by automatic operation of switch 14. This is accomplished in the illustrated device by a thermo responsive bulb 31 located in an enlarged chamber 32 at the right hand end of casing 11, and connected by tube 33 with a capsule 34. The closed system defined by these elements is partially filled with a fluid having a vapor pressure at a temperature of about 140° F., which is sufficient to cause diaphragm 35 of the capsule to actuate button 36 of switch 14, thus opening an electric circuit including leads 15 and resistance wire 21. Conversely, when the temperature affecting bulb 31 drops below a predetermined value, the vapor pressure of the fluid is so lowered as to allow diaphragm 35 to release button 36, thus causing switch 14 to close, and again complete a circuit through the heating element. Thermostatic switches of this type are so well known as to require no further description and it will be apparent to those familiar with the art that any appropriate thermostatic switch may be substituted for the one which is here shown.

It is of particular note that the thermo-responsive element of the device is so located as to respond directly to changes in the temperature of casing 11, and only indirectly to the temperature of the oil in the tank. In the preferred arrangement, the bulb 31 is mounted in a well 37 having its outer open end threaded into the base of coupling 13, and its closed inner end tightly fitted in an opening 38 in a metal collar 39. The latter element is, in turn, tightly fitted within the enlarged chamber 32 of the casing 11 with its outer surface frictionally engaging the inner surface of that chamber. This collar thus provides a path for the conduction of heat from the finned section of casing 11 through the plain surfaced section 40 thereof to well 37, and the thermo responsive bulb 31, so that the latter may at all times respond to casing temperature changes. In this connection it should be noted that the collar 39 is spaced from the inner end of chamber 32 so that oil lying between these parts may effectively insulate them and minimize direct flow of heat from the heating element 10 into the collar and to the bulb.

The placing of thermal bulb in such a position that it will respond directly to changes in casing temperature is a feature of particular importance in a heater which is to be employed in an auxiliary oil tank or the like. In such a service, of course, the level of oil in the tank is constantly reduced as oil is withdrawn for make-up purposes, and may ultimately drop to a point at which the heater surfaces are uncovered. This possibility makes no difference to the operation of the present heater, however, for its thermo-responsive element always functions to hold the temperature of casing 11 below a predetermined value, regardless of the load which is imposed upon the heater unit. If the supply of oil has been materially reduced so that there is only a small quantity present to absorb the entire heat output of the unit, all that happens is that the heater will not be used to its full capacity. In such a case the thermo-responsive element cuts switch 14 in and out in accordance with actual heating requirements to maintain the surface of the heater at the desired value and effectively prevent the heating of the oil to a cracking and carbonizing temperature. In the event that oil is withdrawn from the tank to a point where the surfaces of the heater are completely uncovered, the thermostatic switch still responds to limit the maximum temperature which the finned casing can attain, and thus prevents the burning out of the heating element or a destructive overheating of the casing itself.

The underside of casing 11 is always in contact with relatively cold oil, and normally runs at a somewhat lower temperature than the upper parts of the fins from which streams of hot oil constantly issue. In order that the horizontally disposed heater of the present invention may have no other positional quality resulting from the off-centered location of its thermostatic bulb, collar 39 is made relatively thick throughout its upper portion and along its sides as viewed in Fig. 3, and is so designed as to provide substantially equal thermal paths from all parts of the outer wall of chamber 32 to well 37. The collar thus serves to average the temperatures affecting bulb 31, so that it will respond no more readily to temperature changes near the bottom of casing 11 than it does to those affecting the upper portion of that casing. It will further be noted that bulb 31 is of generally cylindrical proportions having a substantially central connection at one of its ends to tube 33. The vapor space in the closed pressure system will therefore always be above the connection between the bulb and tube, wherefore the true vapor pressure generated in bulb 31 will react through a column of liquid in the connecting tube and against diaphragm 35 to cause an operation of switch 14 in the desired way. There is no likelihood that tube 33 will, at any time, be a part of the vapor space of the system within which vapor generated in the thermo responsive bulb may condense, thereby balancing the system so that the diaphragm will not be affected in the desired way. These features greatly simplify installation of the heater unit by making it unnecessary to locate the unit with its thermo responsive bulb 31 in any particular final position. All that is required is that the coupling 13 be turned down in boss 17, or that the heater unit be otherwise secured to an oil chamber, tightly enough to prevent leakage. It will make no difference in the operation of the installed unit whether the bulb comes to rest on the underside of the device in much the position shown in Fig. 2, or in a position 180° from that illustrated location, or at one side of the unit, for it will respond equally well in any of these positions to limit the temperature to which the casing can be heated.

It is particularly to be noted that coupling member 13 is spaced from the end of casing 11, and is secured to the heater element only by stud 26, and to some extent by the well 37 which surrounds and protects the thermo responsive bulb 31 against mechanical injury. The coupling is purposely isolated from the rest of the heater unit as much as possible, so that substantially all heat generated by element 10 may flow over casing 11 to the oil in the tank with a minimum loss by direct conduction to the coupling and to the tank walls. This stud is purposely given a small diameter by comparison with the rest of the structure, and in some instances is made of stainless steel or other metal having a much lower coefficient of heat transfer than aluminum, brass, copper, or the like, of which casing 11 and shell 22 are normally made. Furthermore, the stud element is purposely spaced from the margins of opening 41 of the collar through which it passes so that oil may flow around the stud and insulate it from the casing and collar elements. The overall result of this feature of the invention is that substantially all of the heat developed by the resistance element is transmitted to the point where it is wanted—namely, in the lubricating oil surrounding casing 11—and only a minimum amount is dissipated by direct conduction to coupling 13 and the outer wall 18 of the tank.

We claim:

1. An electric immersion heater unit comprising a tubular metal casing having a series of metal fins on its outer surface and an enlarged chamber at one end having a smooth outer surface of a diameter approximating that of said fins; an electrical resistance element confined in the finned portion of said casing for supplying heat directly thereto; a stud extending from said heating element through said enlarged chamber of said casing and spaced from the inner wall thereof; a coupling member secured to the outer end of said stud in spaced relation to the chambered end of said casing; electrical switching means for said heating element mounted on said coupling member; a thermo responsive bulb for actuating said switching means, said bulb being located in said enlarged chamber adjacent the inner wall thereof, and spaced from the adjacent end of said heating element and from said stud; and a metal collar frictionally engaging the inner circumferential wall of said chamber and providing a metal-to-metal path for conducting heat substantially uniformly from all parts of such inner wall to said bulb.

2. An electric immersion heater including a unitary heating element comprising electric resistance material, a closed tubular shell encasing said resistance material, and a tubular stud extending from one end of said shell for housing electrical connections to said resistance material; a unitary metal casing having a central bore engaging said shell, a series of annular fins formed in its outer surface overlying said shell, and an enlarged chamber at its inner end through which said stud extends in spaced relation to said casing; a coupling member separably fastened to the inner end of said stud and spaced from the adjacent inner end of said casing to permit passage of oil into said enlarged chamber and around said stud when the heater is immersed therein; thermo responsive electrical switching means for a circuit including said resistance material, said means being mounted on said coupling member and including a thermo-responsive bulb so disposed as to project into said enlarged chamber of said casing; and a metal collar frictionally engaging the inner wall of said chamber and spaced from the adjacent inner end of said shell and from said stud, said collar providing a metal-to-metal path for conducting heat from said casing to said thermo responsive bulb.

3. An electric immersion heater unit comprising a tubular metal heat transfer casing having a chamber in one of its ends; an electric resistance element confined in said casing for supplying heat thereto; a coupling member spaced from the chambered end of said casing; a tubular stud extending through the chambered end of said casing and fixed to said coupling; an electric switch for said heating element carried by said coupling; means for actuating said switch, said means including a thermo responsive bulb located in said enlarged chamber; and a metal collar frictionally engaging the inner wall of said chamber and spaced from the adjacent end of said resistance element, said collar providing a metal-to-metal path for substantially uniform conduction of heat from all parts of the outer wall of said chamber to said thermo responsive bulb.

JOHN D. MORGAN.
PERCY B. LEVITT.

REFERENCES CITED

The following references are of record in the file of this patent:

UNITED STATES PATENTS

| Number | Name | Date |
| --- | --- | --- |
| 1,615,464 | Marsden | Jan. 25, 1927 |
| 2,148,407 | Pierson | Feb. 21, 1939 |
| 2,337,836 | Price | Dec. 28, 1943 |
| 1,120,966 | Neiman | Dec. 15, 1914 |
| 1,709,645 | Woodson | Apr. 16, 1929 |
| 1,837,000 | Wertz | Dec. 15, 1931 |
| 1,888,400 | Vernet | Nov. 22, 1932 |
| 1,974,302 | Finlayson | Sept. 18, 1934 |
| 2,201,703 | Sage | May 21, 1940 |
| 2,362,680 | Troupe | Nov. 14, 1944 |